US012603384B2

(12) United States Patent
Yoon et al.

(10) Patent No.: US 12,603,384 B2
(45) Date of Patent: Apr. 14, 2026

(54) BATTERY MODULE AND BATTERY PACK INCLUDING THE SAME

(71) Applicant: LG ENERGY SOLUTION, LTD., Seoul (KR)

(72) Inventors: Seok Eun Yoon, Daejeon (KR); Hyemi Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 526 days.

(21) Appl. No.: 17/927,294

(22) PCT Filed: Jan. 13, 2022

(86) PCT No.: PCT/KR2022/000652
§ 371 (c)(1),
(2) Date: Nov. 22, 2022

(87) PCT Pub. No.: WO2022/158792
PCT Pub. Date: Jul. 28, 2022

(65) Prior Publication Data
US 2023/0299414 A1 Sep. 21, 2023

(30) Foreign Application Priority Data
Jan. 22, 2021 (KR) ........................ 10-2021-0009239

(51) Int. Cl.
| | |
|---|---|
| *H01M 50/367* | (2021.01) |
| *H01M 50/211* | (2021.01) |
| *H01M 50/296* | (2021.01) |
| *H01M 50/505* | (2021.01) |

(52) U.S. Cl.
CPC ....... *H01M 50/367* (2021.01); *H01M 50/211* (2021.01); *H01M 50/296* (2021.01); *H01M 50/505* (2021.01)

(58) Field of Classification Search
CPC ............. H01M 50/367; H01M 50/211; H01M 50/296; H01M 50/505; H01M 50/249; H01M 50/325; H01M 2220/20; H01M 50/3425; H01M 2200/20; Y02E 60/10
See application file for complete search history.

(56) References Cited

U.S. PATENT DOCUMENTS

| | | | | |
|---|---|---|---|---|
| 9,084,375 | B2 * | 7/2015 | Hughes | .............. H05K 7/20727 |
| 9,614,209 | B2 | 4/2017 | Jones et al. | |
| 2010/0215998 | A1 * | 8/2010 | Byun | .................. H01M 50/627 429/82 |

| | | | | |
|---|---|---|---|---|
| 2011/0177365 | A1 * | 7/2011 | Yasui | .................. H01M 50/512 429/61 |
| 2011/0200854 | A1 | 8/2011 | Bak et al. | |
| 2011/0287286 | A1 * | 11/2011 | Ahn | .................. H01M 50/3425 429/56 |
| 2012/0208052 | A1 | 8/2012 | Kim | |
| 2014/0154541 | A1 | 6/2014 | Asakura et al. | |
| 2014/0376221 | A1 * | 12/2014 | Eliason | .................. B05D 3/067 362/235 |
| 2015/0064514 | A1 * | 3/2015 | Wu | ..................... H01M 50/293 429/120 |
| 2017/0025664 | A1 * | 1/2017 | Lim | .................. H01M 10/6557 |
| 2021/0265705 | A1 | 8/2021 | Min et al. | |
| 2021/0296738 | A1 | 9/2021 | Lee et al. | |
| 2022/0255185 | A1 * | 8/2022 | Lee | ..................... H01M 50/383 |

FOREIGN PATENT DOCUMENTS

| | | | |
|---|---|---|---|
| CN | 105849933 | A | 8/2016 |
| EP | 3 923 370 | A1 | 12/2021 |
| JP | 2011-193570 | A | 10/2011 |
| JP | 2012-1991156 | A | 10/2012 |
| JP | 2012199186 | A * | 10/2012 |
| JP | 2014-60165 | A | 4/2014 |
| JP | 2014-110138 | A | 6/2014 |
| JP | 5673979 | B2 | 2/2015 |
| JP | 2016-46163 | A | 4/2016 |
| JP | 5939307 | B2 | 6/2016 |
| JP | 2016-534518 | A | 11/2016 |
| JP | 6612966 | B2 | 11/2019 |
| JP | 2020-115452 | A | 7/2020 |
| KR | 10-2011-0095118 | A | 8/2011 |
| KR | 10-2012-0092368 | A | 8/2012 |
| KR | 10-1137366 | B1 | 8/2012 |
| KR | 10-1254830 | B1 | 4/2013 |
| KR | 10-1261707 | B1 | 5/2013 |
| KR | 10-2020-0142455 | A | 12/2020 |
| KR | 10-2021-0002919 | A | 1/2021 |
| WO | WO 2020/171629 | A1 | 8/2020 |

OTHER PUBLICATIONS

International Search Report (PCT/ISA/210) issued in PCT/KR2022/000652, dated May 4, 2022.
Extended European Search Report for European Application No. 22742768.9, dated Dec. 11, 2023.

* cited by examiner

*Primary Examiner* — Muhammad S Siddiquee
(74) *Attorney, Agent, or Firm* — Birch, Stewart, Kolasch & Birch, LLP

(57) ABSTRACT

Discussed is a battery module that may include a battery cell stack in which a plurality of battery cells are stacked, a module frame that houses the battery cell stack; and at least one venting part on an upper part of the module frame, wherein at least one edge of the at least one venting part may be connected to the upper part of the module frame, and a remaining edge of the at least one venting part may be formed by the upper part of the module frame that is cut open.

11 Claims, 10 Drawing Sheets

【FIG. 1】 [Conventional Art]
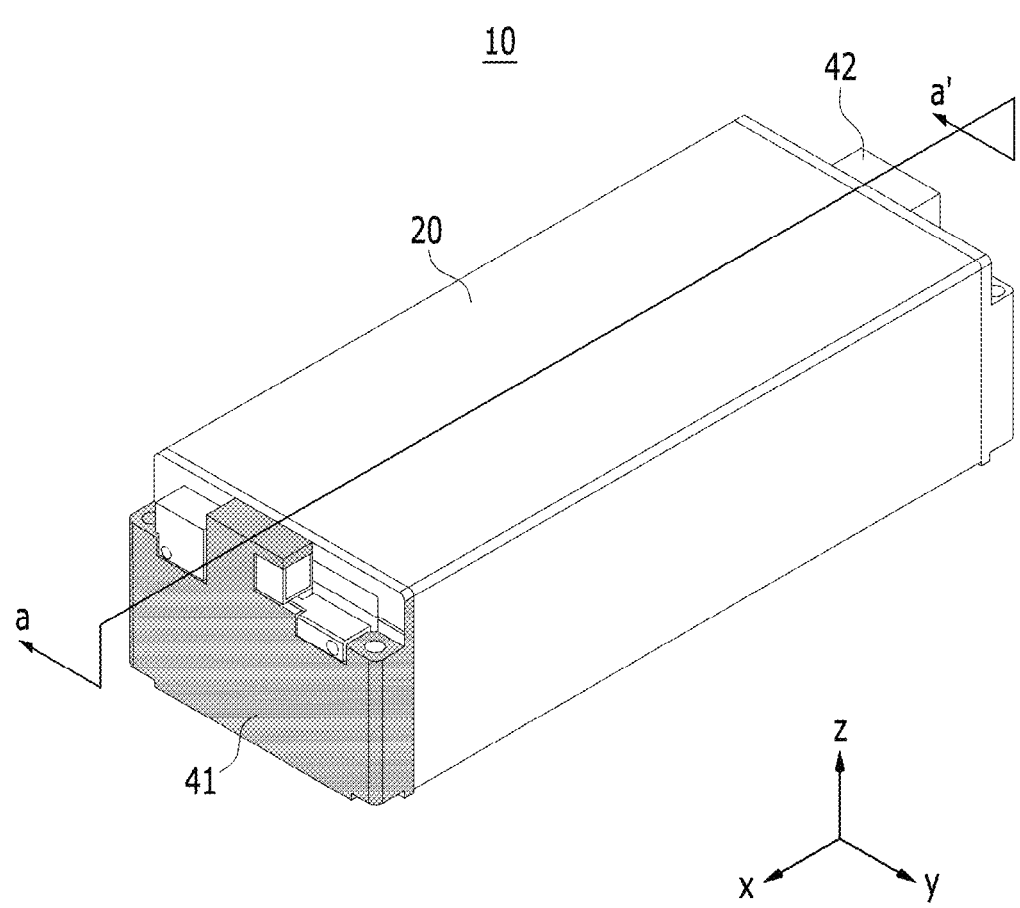

[FIG. 2]
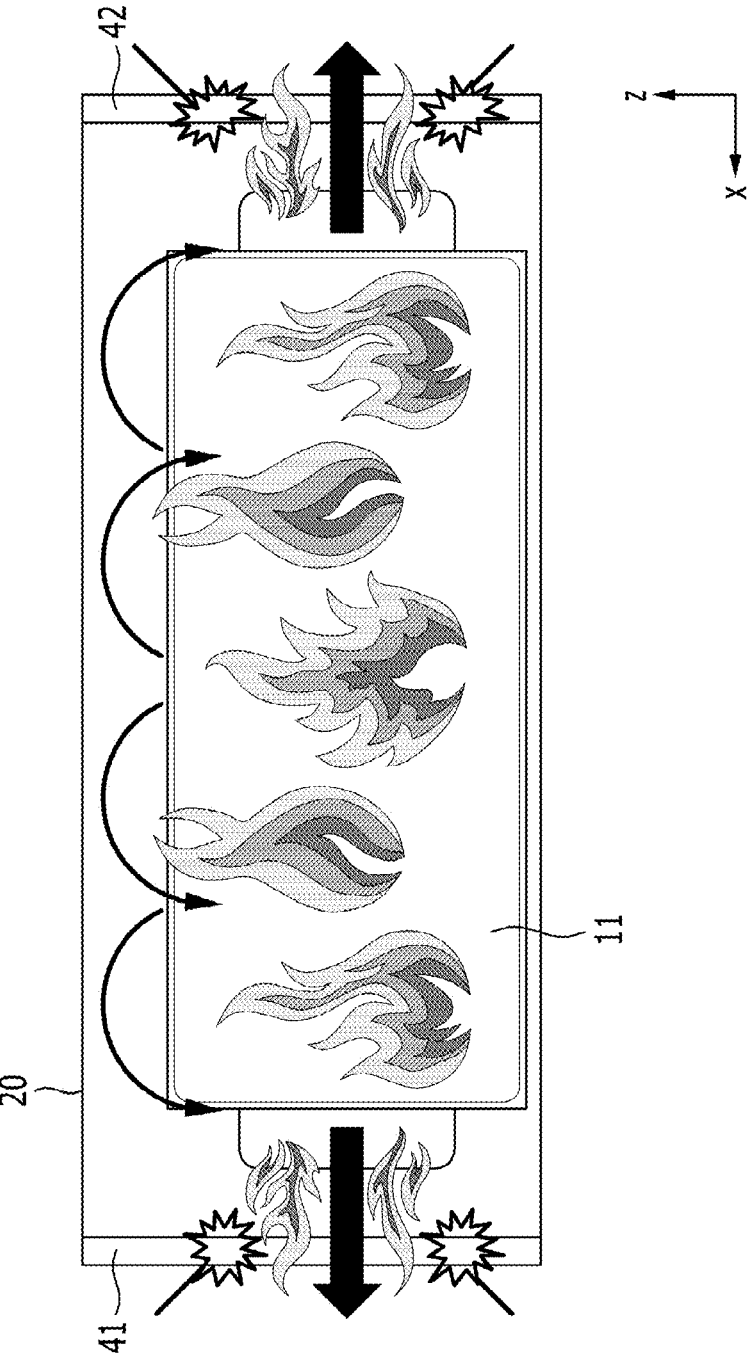

[FIG. 3]
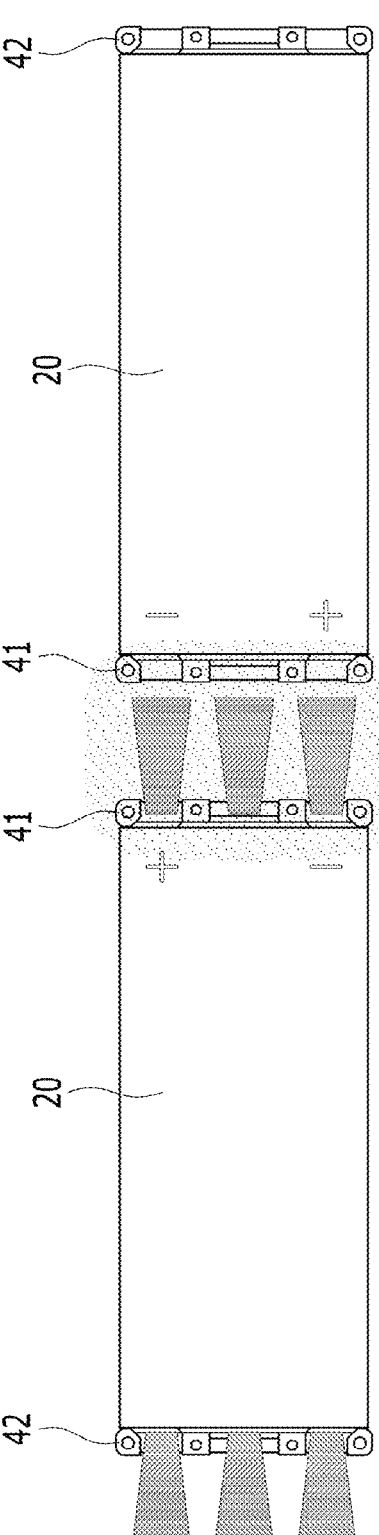

【FIG. 4】
100
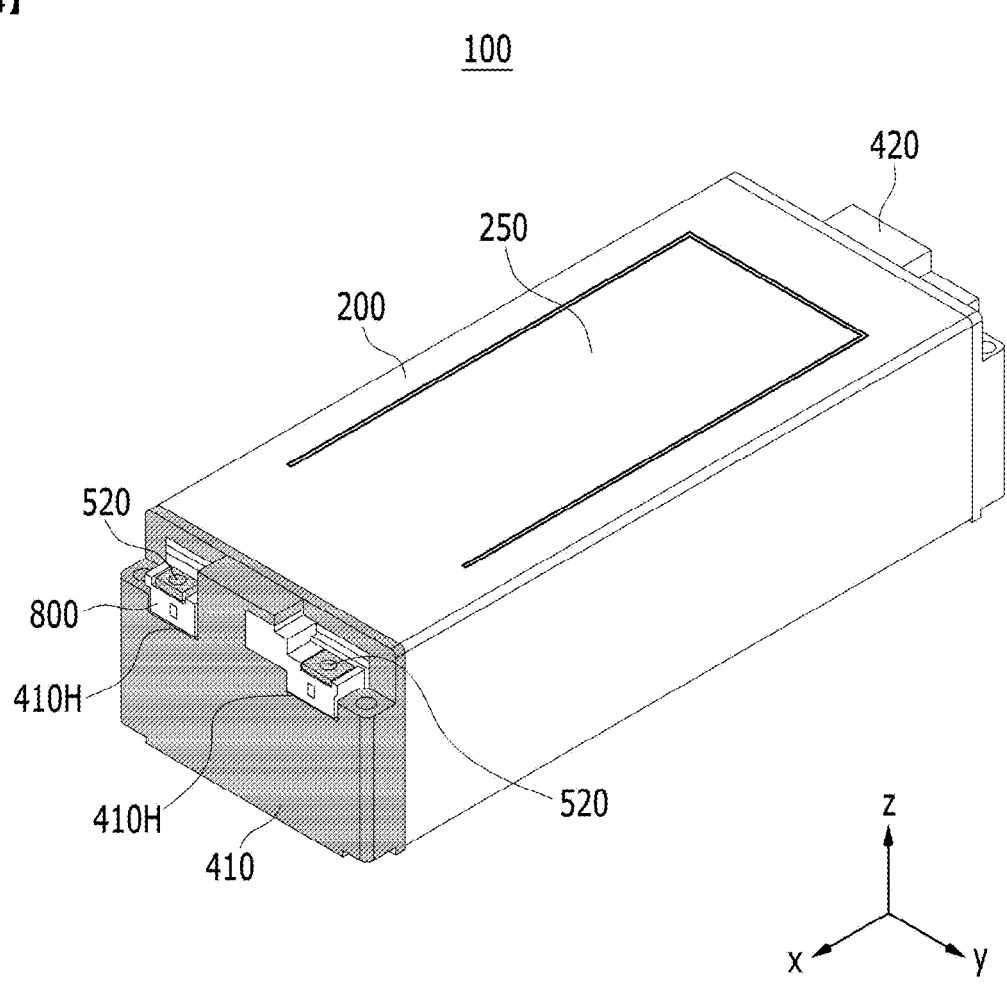

[FIG. 5]
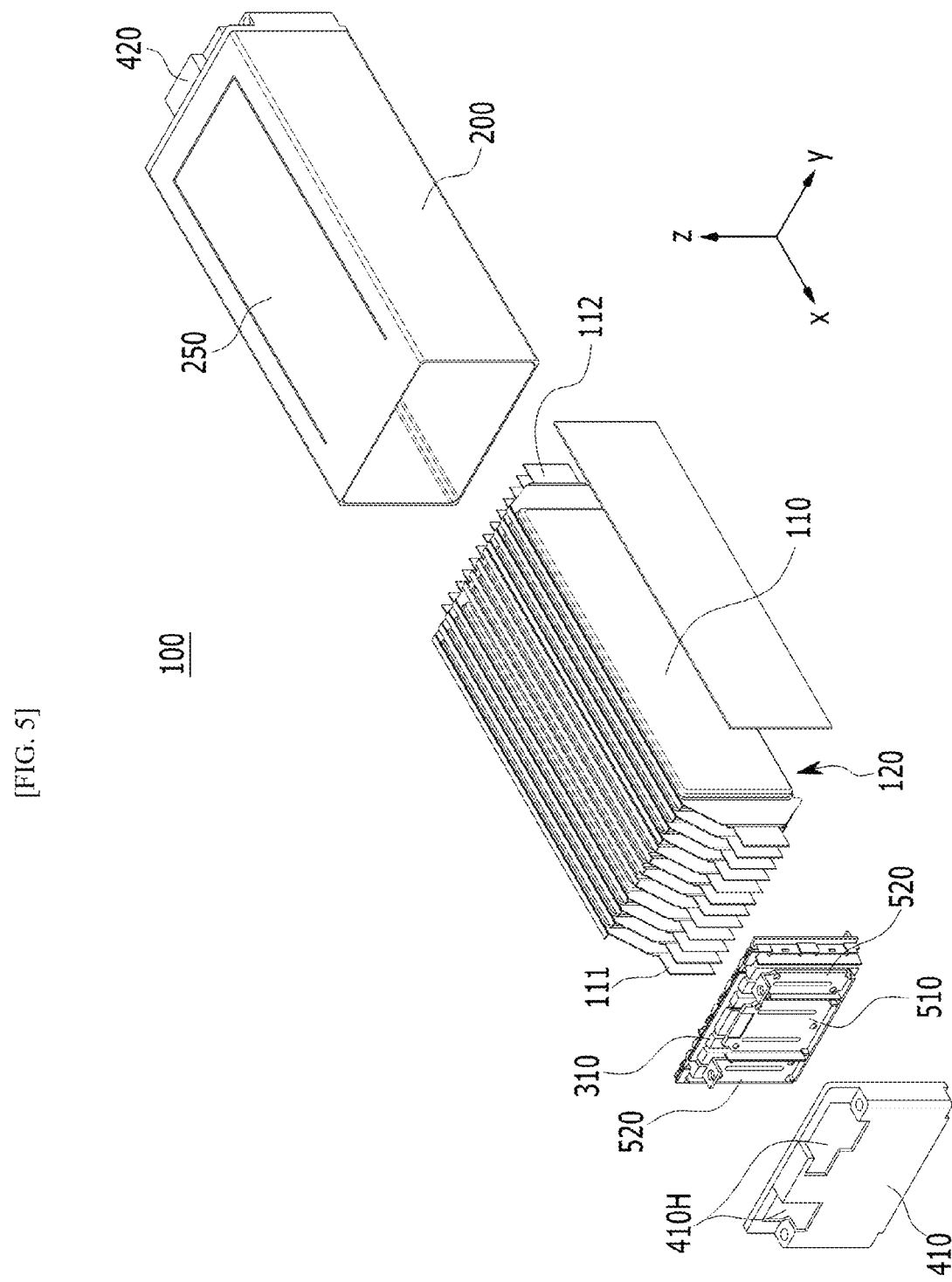

【FIG. 6】
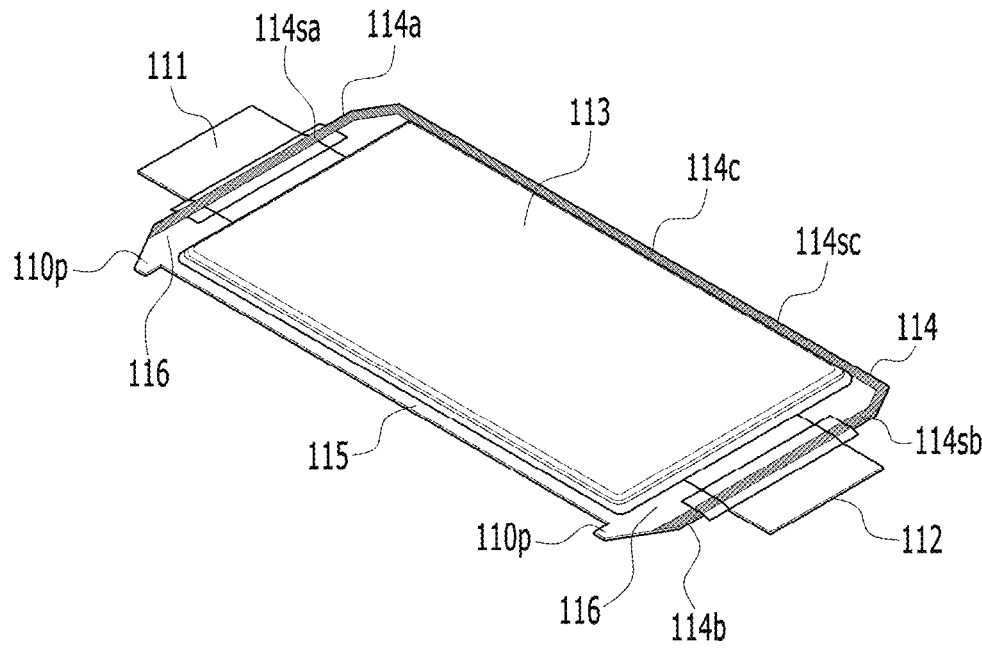

【FIG. 7】
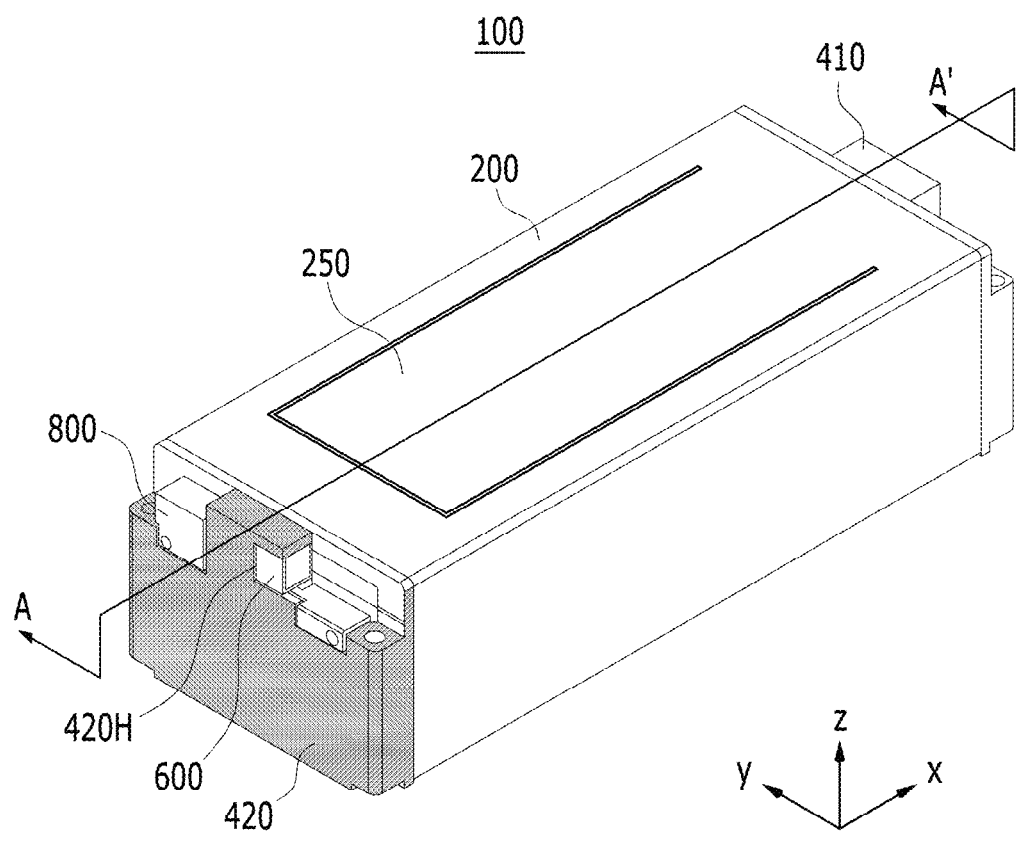

【FIG. 8】
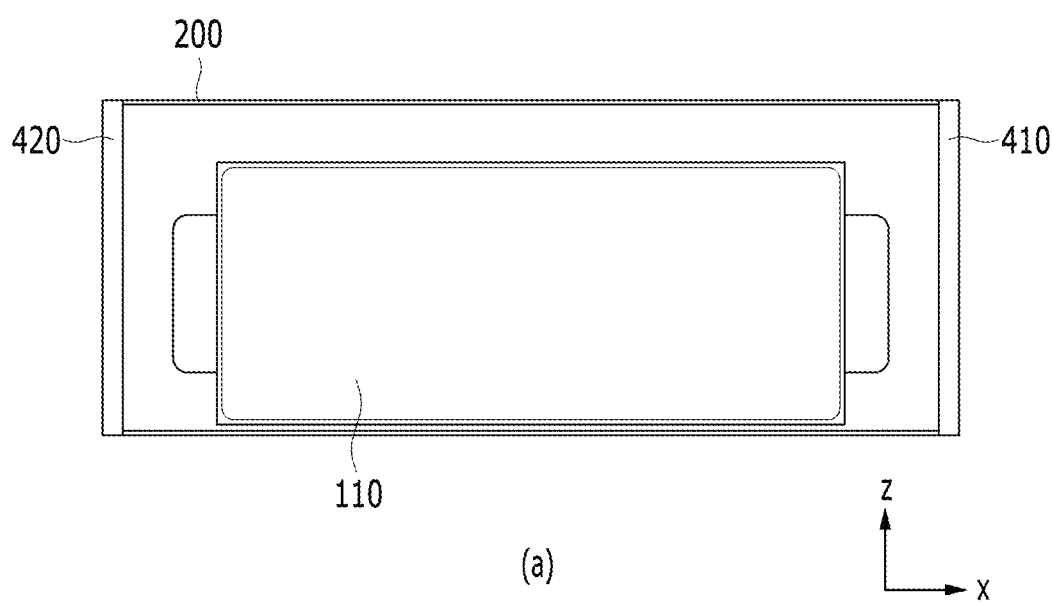
(a)
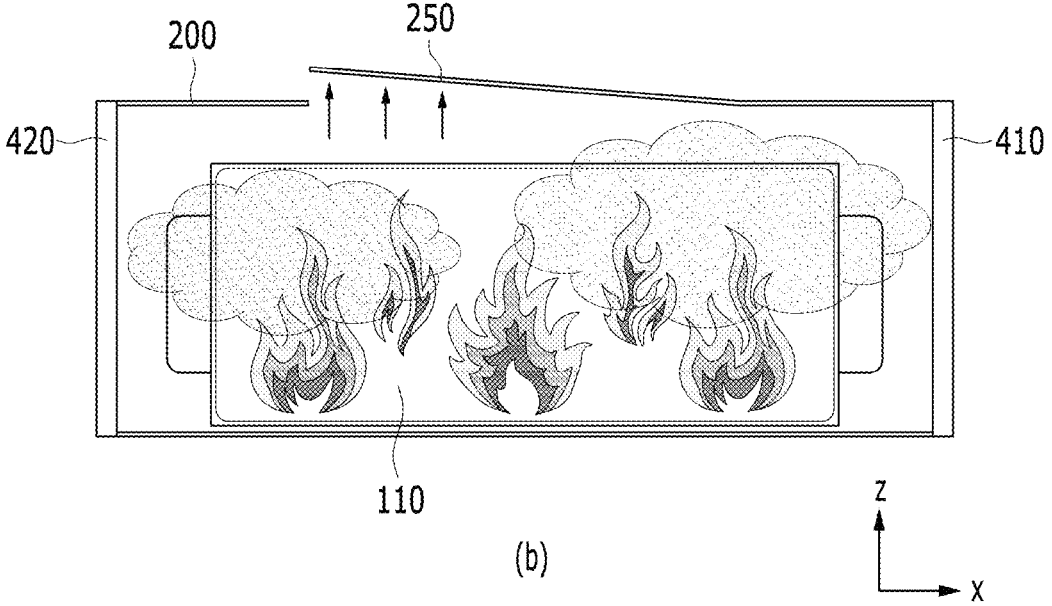
(b)

[FIG. 9]
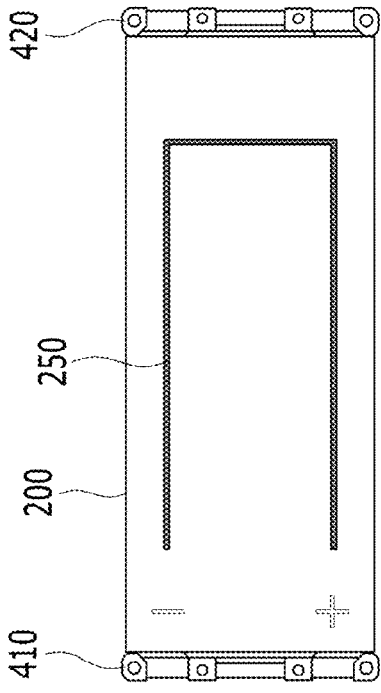
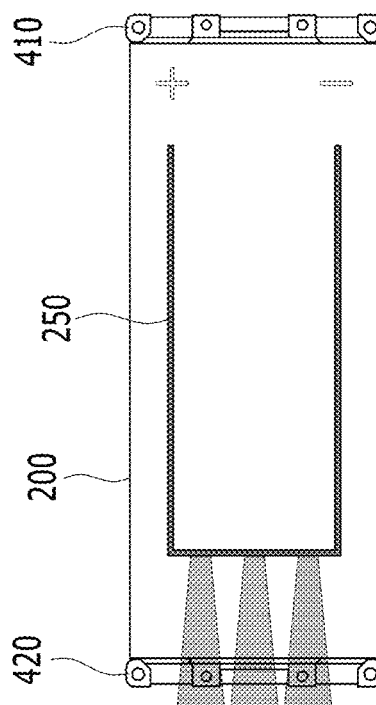

[FIG. 10]
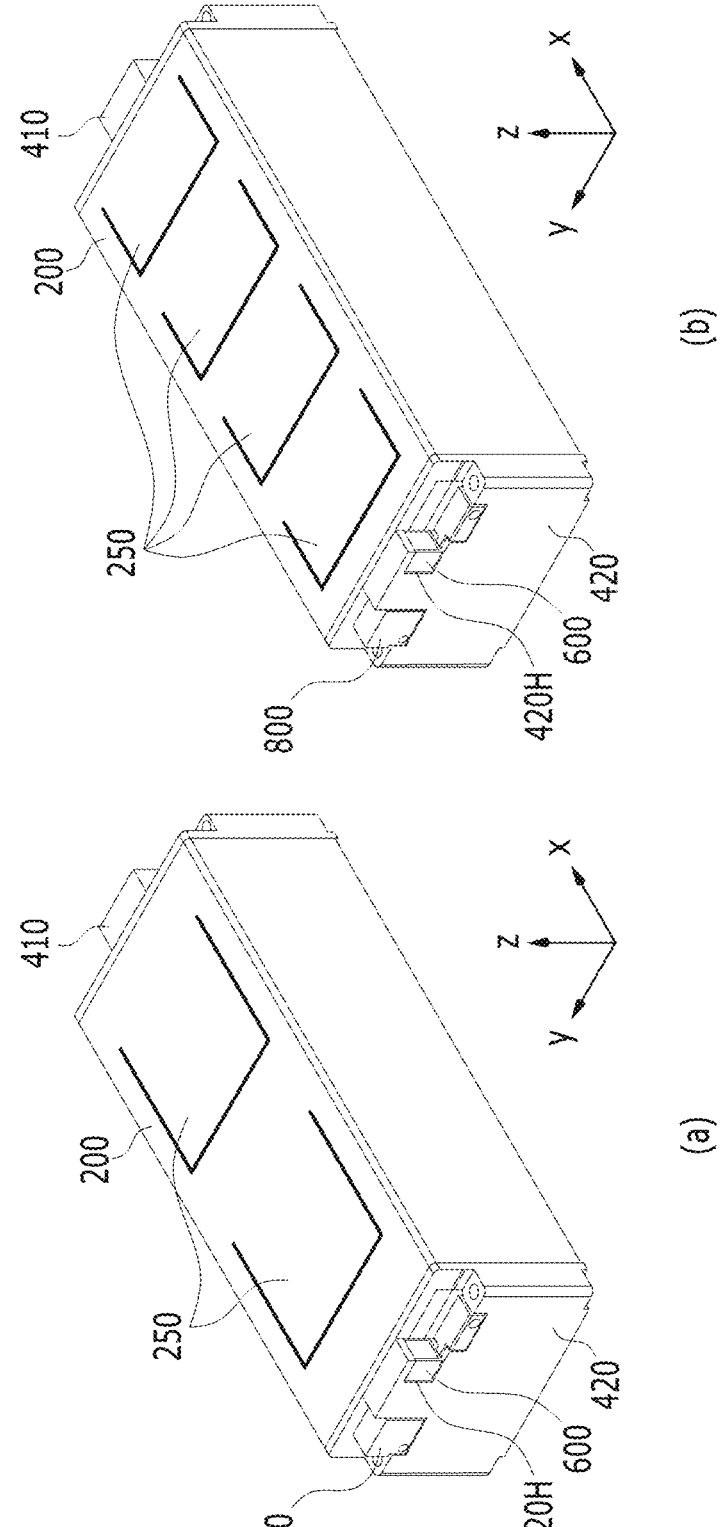

BATTERY MODULE AND BATTERY PACK INCLUDING THE SAME

TECHNICAL FIELD

Cross Citation with Related Application(s)

This application claims the benefit of Korean Patent Application No. 10-2021-0009239 filed on Jan. 22, 2021 with the Korean Intellectual Property Office, the content of which is incorporated herein by reference in its entirety.

The present disclosure relates to a battery module and a battery pack including the same, and more particularly, to a battery module that guides the discharge direction of gas and flame and thus minimizes the ignition continuity between adjacent battery modules, and a battery pack including the same.

BACKGROUND ART

Along with the increase of technology development and demands for mobile devices, the demand for batteries as energy sources is increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably manufactured so as to have as small a size and weight as possible. Consequently, a prismatic battery, a pouch-shaped battery or the like, which can be stacked with high integration and has a small weight relative to capacity, is mainly used as a battery cell of the middle or large-sized battery module. Meanwhile, in order to protect the battery cell stack from external impact, heat or vibration, the battery module may include a module frame which is opened in its front and rear sides and houses the battery cell stack in an internal space.

FIG. 1 is a perspective view showing a conventional battery module. FIG. 2 is a cross-sectional view taken along the a-a' axis of FIG. 1 at the time of ignition of a battery module. FIG. 3 is a diagram showing a state at the time of ignition of the battery module of FIG. 1 attached to the conventional battery pack.

Referring to FIGS. 1 and 2, a conventional battery module 10 includes a battery cell stack (not shown) in which a plurality of battery cells 11 are stacked, a module frame 20 that houses the battery cell stack, and end plates 41 and 42 that cover the front and rear surfaces of the battery cell stack. Here, the module frame 20 and the end plates 41 and 42 can be coupled so as to be sealed through welding. However, at the time of overcharge of the battery module 10, when the internal pressure of the battery cell 11 increases and exceeds the limit value of the welding strength of the battery cell 11, high-temperature heat, gas, and flame generated in the battery cell 11 can be discharged to the outside of the battery module 10.

Referring to FIGS. 2 and 3, high-temperature heat, gas, and flame can be ejected to the outside through a fragile part included in the end plates 41 and 42 located in both directions of the battery module 10, which particularly affect even the end plates 41 and 42 of adjacent battery module, thereby occurring ignition continuity. At this time, the adjacent battery modules also have a problem that gas, flame or the like enter the inside of the module frame 20 through the fragile part included in the end plates 41 and 42, and damage a plurality of battery cells 11.

Therefore, there is a need to develop a battery module that guides the discharge direction of gas and flame and thus minimizes the ignition continuity between adjacent battery modules.

DETAILED DESCRIPTION OF THE INVENTION

Technical Problem

It is an object of the present disclosure to provide a battery module that guides the discharge direction of gas and flame and thus minimizes the ignition continuity between adjacent battery modules and a battery pack including the same.

The objects of the present disclosure are not limited to the aforementioned objects, and other objects which are not described herein should be clearly understood by those skilled in the art from the following detailed description and the accompanying drawings.

Technical Solution

According to one embodiment of the present disclosure, there is provided a battery module including: a battery cell stack in which a plurality of battery cells are stacked; a module frame that houses the battery cell stack; and at least one venting part on an upper part of the module frame, wherein at least one edge of the at least one venting part is connected to the upper part of the module frame, and a remaining edge of the at least one venting part is formed by the upper part of the module frame that is cut open.

The remaining edge includes a plurality of edges, and the plurality of edges that are cut open in the venting part are connected to each other.

Based on the at least one edge connected to the upper part of the module frame in the venting part, the venting part may be configured to be lifted diagonally from the upper part of the module frame toward an outside thereof.

The battery module may further include a first busbar frame that covers a front surface of the battery cell stack and to which a terminal busbar is connected; a second busbar frame that covers a rear surface of the battery cell stack and to which a module connector is connected; and a first end plate and a second end plate that are coupled to the module frame and cover the first busbar frame and the second busbar frame, respectively.

In the at least one venting part, the at least one edge connected to the upper part of the module frame may be located adjacent to the first end plate.

In the at least one venting part, the at least one edge connected to the upper part of the module frame may extend along a width direction of the module frame.

The at least one venting part may be configured to be lifted so that any high-temperature heat, gas and flames are vented in a direction in which the second end plate is disposed.

The at least one venting part of the battery module may include at least two venting parts, wherein the at least two venting parts may be spaced apart from each other along a longitudinal direction of the module frame.

The at least two venting parts may be disposed in a same direction as each other.

The terminal busbar may be connected to an external busbar that allows connection with other battery modules adjacent to the battery module including the terminal busbar.

According to another embodiment of the present disclosure, there is provided a battery pack including the above-mentioned battery module.

Advantageous Effects

According to embodiments, the present disclosure includes a venting part in the upper part of the module frame that guides the discharge direction of gas and flame in a predetermined direction, thereby being able to minimize the ignition continuity between adjacent battery modules.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view showing a conventional battery module;

FIG. 2 is a cross-sectional view taken along the a-a' axis of FIG. 1 at the time of ignition of a battery module;

FIG. 3 is a diagram showing a state at the time of ignition of the battery module of FIG. 1 attached to the conventional battery pack;

FIG. 4 is a perspective view showing a battery module according to an embodiment of the present disclosure;

FIG. 5 is an exploded perspective view of the battery module of FIG. 4;

FIG. 6 is a perspective view of a battery cell included in the battery module of FIG. 4;

FIG. 7 is a perspective view showing the second end plate of the battery module of FIG. 4 at different angles so that it can be seen from the front;

FIG. 8 is a cross-sectional view taken along the axis A-A' of FIG. 7;

FIG. 9 is a view showing a state at the time of ignition of the battery module of FIG. 4 mounted on the battery pack according to another embodiment of the present disclosure; and FIG. 10 is a perspective view of a battery module according to another embodiment of the present disclosure.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity.

In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

Hereinafter, a battery module according to an embodiment of the present disclosure will be described. However, the description will be given based on the front surface of the front and back surfaces of the battery module, but is not necessarily limited thereto. Even in the case of the rear side, it will be described in the same or similar manner.

FIG. 4 is a perspective view showing a battery module according to an embodiment of the present disclosure. FIG. 5 is an exploded perspective view of the battery module of FIG. 4. FIG. 6 is a perspective view of a battery cell included in the battery module of FIG. 4.

Referring to FIGS. 4 to 6, the battery module 100 according to an embodiment of the present disclosure includes a battery cell stack 120 in which a plurality of battery cells 110 including electrode leads 111 and 112 protruding in mutually opposite directions are stacked, a module frame 200 that houses the battery cell stack 120, and a first busbar frame 310 that is disposed on one surface of the battery cell stack 120 in one direction (x-axis direction) from which the electrode lead 111 protrudes.

First, referring to FIG. 6, the battery cell 110 is preferably a pouch type battery cell. For example, the battery cell 110 according to the present embodiment has a structure in which two electrode leads 111 and 112 face each other and protrude from one end 114a and the other end 114b of a cell body 113, respectively. More specifically, the electrode leads 111 and 112 are connected to an electrode assembly (not shown) and protrude from the electrode assembly (not shown) to the outside of the battery cell 110.

Meanwhile, the battery cell 110 can be manufactured by joining both ends 114a and 114b of the cell case 114 and one side surface 114c connecting them in a state in which an electrode assembly (not shown) is housed in a cell case 114. In other words, the battery cells 110 according to the present embodiment have a total of three seal parts 114sa, 114sb and 114sc, the seal parts 114sa, 114sb and 114sc have a structure that is sealed by a method such as heat welding, and the remaining other one side part can be formed of a connection part 115. The cell case 114 may be formed of a laminated sheet including a resin layer and a metal layer.

In addition, the connection part 115 may extend long along one edge of the battery cell 110, and a protrusion part 110p of the battery cell 110 called a bat-ear may be formed at an end part of the connection part 115. Further, while the cell case 114 is sealed with the protruding electrode leads 111 and 112 being interposed therebetween, a terrace part 116 may be formed between the electrode leads 111 and 112 and the cell main body 113. That is, the battery cell 110 includes a terrace part 116 formed to extend from the cell case 114 in a protruding direction of the electrode leads 111 and 112.

The battery cell 110 may be configured in plural numbers, and the plurality of battery cells 110 can be stacked so as to be electrically connected to each other, thereby forming a battery cell stack 120. Referring to FIG. 5, the battery cells 110 can be stacked along the y-axis direction to form a battery cell stack 120. A first busbar frame 310 may be located on one surface of the battery cell stack 120 in the protruding direction (x-axis direction) of the electrode leads 111. Although not specifically shown in the figure, a second busbar frame may be located on the other surface of the battery cell stack 120 in the protruding direction (−x-axis direction) of the electrode leads 112. The battery cell stack 120 and the first busbar frame 310 may be housed together within the module frame 200. The module frame 200 can protect the battery cell stack 120 housed inside the module frame 200 and the electrical components connected thereto from external physical impacts.

The module frame 200 according to an embodiment of the present disclosure may have the structure of a mono frame. First, the mono frame may be in a metal plate shape in which the upper surface, the lower surface and both side surfaces are integrated. The mono frame can be manufactured by extrusion molding. However, the structure of the module frame 200 is not limited thereto, and may be a structure in which a U-shaped frame and an upper plate are combined. In the case of a structure in which the U-shaped frame and the upper plate are combined, the structure may be formed by coupling the upper plate to the upper side of the U-shaped frame, which is a metal plate in which the lower surface and both sides are combined or integrated, and can be manufactured by press molding.

A thermal conductive resin may be injected between the battery cell stack 120 and the lower surface of the module frame 200, and a thermal conductive resin layer (not shown) may be formed between the battery cell stack 120 and the lower surface of the module frame 200 through the injected thermal conductive resin.

Meanwhile, the module frame 200 can be opened in the protruding direction of the electrode leads 111 and 112 (x-axis direction, −x-axis direction), and a first end plate 410 and a second end plate 420 may be located on opened both sides of the module frame 200, respectively. The first end plate 410 can be joined to the module frame 200 while covering the first busbar frame 310, and the second end plate 420 can be joined to the module frame 200 while covering the second busbar frame (not shown). That is, a first busbar frame 310 may be located between the first end plate 410 and the battery cell stack 120, and a second busbar frame (not shown) may be located between the second end plate 420 and the battery cell stack 120. Further, an insulating cover 800 (see FIG. 4) for electrical insulation may be located between the first end plate 410 and the first busbar frame 310.

The first end plate 410 and the second end plate 420 are located so as to cover the one surface and the other surface of the battery cell stack 120, respectively. The first end plate 410 and the second end plate 420 can protect the first busbar frame 310 and various electrical components connected thereto from external impacts. For this purpose, they must have a predetermined strength and may include a metal such as aluminum. Further, the first end plate 410 and the second end plate 420 may be joined to a corresponding edge of the module frame 200 by a method such as welding, respectively.

The first busbar frame 310 can be located on one surface of the battery cell stack 120 to cover the battery cell stack 120 and at the same time, guide the connection between the battery cell stack 120 and external devices. Specifically, at least one of a busbar, a terminal busbar and a module connector may be mounted onto the first busbar frame 310. Particularly, at least one of the busbar, the terminal busbar and the module connector may be mounted onto a surface opposite to the surface of the first busbar frame 310 facing the battery cell stack. In one example, FIG. 4 shows a state in which the busbar 510 and the terminal busbar 520 are mounted onto the first busbar frame 310.

The battery cells 110 constituting the battery cell stack 120 may be connected in series or in parallel by a busbar 510 or a terminal busbar 520, and the battery cells 110 can be electrically connected to an external device or circuit through the terminal busbar 520 exposed to the outside of the battery module 100. In one example, the terminal busbar 520 may be connected to an external busbar that allows connection with other battery modules adjacent to the battery module including the terminal busbar 520.

The first busbar frame 310 may include an electrically insulating material. The first busbar frame 310 restricts the busbar 510 or the terminal busbar 520 from making contact with the battery cells 110, except for the portion where the busbar 510 or the terminal busbar 520 is joined to the electrode leads 111, thereby preventing the occurrence of a short circuit.

On the other hand, as described above, the second busbar frame may be located on the other surface of the battery cell stack 120, and the busbar and module connector may be mounted onto the second busbar frame. An electrode lead 112 can be joined to such a busbar.

The first end plate 410 according to the present embodiment can be formed with an opening in which the terminal busbar 520 is exposed. The opening may be a terminal busbar opening. In one example, as shown in FIGS. 3 and 4, a terminal busbar opening 410H where the terminal busbar 520 is exposed can be formed in the first end plate 410. The terminal busbar 520 further includes an upwardly protruding portion as compared with the busbar 510. Such upwardly protruding portion may be exposed to the outside of the battery module 100 via the terminal busbar opening 410H. The terminal busbar 520 exposed via the terminal busbar opening 410H may be connected to another battery module or a battery disconnect unit (BDU) to form a high voltage (HV) connection.

FIG. 7 is a perspective view showing the second end plate of the battery module of FIG. 4 at different angles so that it can be seen from the front.

Referring to FIG. 7, an opening where at least one of module connectors is exposed may be formed in the second end plate 420 according to the present embodiment. The opening may be a module connector opening. In one example, as shown in FIG. 7, a module connector opening 420H where the module connector 600 is exposed may be formed in the second end plate 420. This means that the module connector 600 is mounted on the above-mentioned second busbar frame. Further, an insulating cover 800 for electrical insulation may be located between the second end plate 420 and the second busbar frame.

Meanwhile, although not specifically shown in the figure, the module connector 600 can be connected to a temperature sensor, a voltage measuring member, or the like provided inside the battery module 100. Such a module connector 600 is connected to an external BMS (battery management system) to form an LV (Low voltage) connection, and it performs a function of transmitting temperature information, voltage level and the like measured by the temperature sensor or the voltage measuring member to the external BMS.

Next, the venting part 250 formed in the module frame 200 will be mainly described.

Referring to FIGS. 4, 5, and 7, the battery module 100 according to the present embodiment includes at least one venting part 250 that is formed on the upper part of the module frame 200, wherein at least one edge of the venting part 250 is connected to the upper part of the module frame 200, and the remaining edge is formed by cutting the upper part of the module frame 200 open.

Further, in the venting part 250, an edge connected to the upper part of the module frame 200 may be located adjacent to the first end plate 410. That is, in the venting part 250, an edge connected to the upper part of the module frame 200 may be formed adjacent to the terminal busbar 520. Further, in the venting part 250, an edge connected to the upper part of the module frame 200 may extend along the width direction of the module frame 200. However, being located adjacent to the first end plate 410 herein may also be described as being located away from the second end plate 420.

In other words, the remaining edge cut open in the venting part 250 may be formed by cutting to a position adjacent to the second end plate 420 open along the longitudinal direction of the module frame 200. That is, a part of the remaining edge cut open in the venting part 250 may be formed adjacent to the module connector 600.

Thereby, the battery module 100 according to the present embodiment can guide the discharge path of the gas and flame discharged by the venting part 250 because the remaining edge cut open in the venting part 250 is cut open adjacent to the second end plate 420.

More specifically, each edge cut open in the venting part 250 may be connected to each other. In one example, the venting part 250 may have a rectangular shape, wherein one edge may be connected to the upper part of the module frame 200 and the remaining edge may be cut open and formed. However, the shape of the venting part 250 is not limited thereto, and any shape can be applied as long as it can guide the discharge direction of the gas and flame in the battery module 100 in a predetermined direction.

Thereby, the battery module 100 according to the present embodiment has the advantage that the manufacturing process is simple and the manufacturing cost is reduced because a part of the upper part of the module frame 200 can be cut open to form the venting part 250.

FIG. 8 is a cross-sectional view taken along the axis A-A' of FIG. 7. FIG. 8(a) is a cross-sectional view taken along the axis A-A' of FIG. 7 during normal operation of the battery module 100, and FIG. 8(b) is a cross-sectional view taken along the A-A' axis of FIG. 7 when the battery module 100 ignites.

Referring to FIG. 8(a), during normal operation of the battery module 100, the venting part 250 may be located on the same plane as the upper part of the module frame 200. That is, the venting unit 250 may seal the upper part of the module frame 200 during normal operation of the battery module 100.

Thereby, the venting part 250 may prevent an external gas from flowing into the module frame 200 during normal operation of the battery module 100.

Referring to FIG. 8(b), when the battery module 100 ignites, based on the edge connected to the upper part of the module frame 200 in the venting part 250, the venting unit 250 may be lifted diagonally from the upper part of the module frame 200 toward the outside thereof. That is, when the battery module 100 ignites, the internal pressure of the module frame 200 increases, so that the venting part 250 is lifted as shown in FIG. 8(b).

Consequently, a gap is generated between the venting part 250 and the upper part of the module frame 200, and this gap may be a discharge path for gas and flame in the module frame 200. Further, the gap generated between the venting part 250 and the upper part of the module frame 200 is formed along the edge of the venting part 250, so that the discharge area of gas and flame is larger, and the discharge effect of gases and flames can also be significantly increased.

FIG. 9 is a view showing a state at the time of ignition of the battery module of FIG. 4 mounted on the battery pack according to another embodiment of the present disclosure.

Referring to FIGS. 2 and 3, in the case of the conventional battery module 10, the high-temperature heat, gas, and flame generated at the time of ignition of the battery module 10 increases the pressure inside the module frame 20, whereby as the fragile parts of the end plates 41 and 42 that are both side surfaces of the battery module 10 are ruptured, which causes a problem that the ignition is propagated to the adjacent battery modules 10.

In particular, for HV connection, the battery module 10 is disposed so as to face the end plates 41 where the terminal busbars (not shown) are located. When the above-mentioned ignition phenomenon occurs, damage may occur to other components including the terminal busbar (not shown) or the battery cell 11 located within the end plates 41 facing each other.

Unlike the same, referring to FIGS. 8 and 9, in the battery module 100 according to an embodiment of the present disclosure, the venting part 250 may be lifted so as to be vented in the direction in which the second end plate 420 is disposed. More specifically, the venting part 250 may guide the discharge path of gas and flame in the module frame 200 so as to be discharged in the direction in which the second end plate 420 is disposed.

Thereby, a gap generated between the venting part 250 and the upper part of the module frame 200 is formed adjacent to the module connector 600 (see FIG. 7), so that it is possible to prevent the high-temperature heat, gas, and flame resulting from the battery cell 110 from being discharged through the opening of the first end plate 410, for example, the terminal busbar opening 410H (see FIG. 5).

This is because when the flame is transferred to the terminal busbar 520 (see FIG. 5), the external busbars connecting to adjacent battery modules may also melt and proceed further ignition due to an internal short circuit, and further the possibility of transition to adjacent battery modules is high. That is, the battery module 100 according to the present embodiment can significantly reduce damage to adjacent battery modules and HV connection structures.

FIG. 10 is a perspective view of a battery module according to another embodiment of the present disclosure.

Referring to FIG. 10, the battery module 100 according to another embodiment of the present disclosure includes at least two venting part 250, wherein at least two venting parts 250 may be spaced apart from each other along the longitudinal direction of the module frame. More specifically, at least two venting parts 250 may be disposed in the same direction with each other. Further, the number of venting part 250 may be two as shown in FIG. 10(a) or four as shown in FIG. 10(*b*), but the number is not limited thereto, and various numbers may be applied.

Thereby, a gap is generated between the at least two venting parts 250 and the upper part of the module frame 200, and this gap can further secure various discharge paths for gas and flame in the module frame 200. That is, since the gas and flame in the module frame 200 can be discharged through the respective paths, the speed at which the gas and flame are discharged can be adjusted.

A battery pack according to another embodiment of the present disclosure includes the battery module described above. Meanwhile, one or more battery modules according to the present embodiment can be packaged in a pack case to form a battery pack.

The above-mentioned battery module and the battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module and a battery pack including the same, which also falls under the scope of the present disclosure.

Although the invention has been shown and described with reference to the preferred embodiments, the scope of the present disclosure is not limited thereto, and numerous changes and modifications can be devised by those skilled in the art using the principles of the invention defined in the appended claims, which also falls within the spirit and scope of the present disclosure.

DESCRIPTION OF REFERENCE NUMERALS

200: module frame
250: venting part
310: busbar frame
410: first end plate
420: second end plate
520: terminal busbar
600: module connector

The invention claimed is:

1. A battery module comprising:
a battery cell stack in which a plurality of battery cells are stacked;
a module frame that houses the battery cell stack; and
at least one venting part on an upper part of the module frame,
wherein at least one edge of the at least one venting part is connected to the upper part of the module frame, and a remaining edge of the at least one venting part is formed by the upper part of the module frame that is cut open,
wherein the remaining edge includes a plurality of edges that are cut open,
wherein the plurality of edges that are cut open in the venting part are connected to each other,

wherein the plurality of edges that are cut open include a pair of length edges extending in a longitudinal direction of the module frame and a width edge extending in a width direction of the module frame and located between the pair of length edges, and
wherein each of the pair of length edges has lengths that are greater than a length of the width edge.

2. The battery module of claim 1, wherein:
based on the at least one edge connected to the upper part of the module frame in the venting part, the venting part is configured to be lifted diagonally from the upper part of the module frame toward an outside thereof.

3. The battery module of claim 2, further comprising:
a first busbar frame that covers a front surface of the battery cell stack and to which a terminal busbar is connected;
a second busbar frame that covers a rear surface of the battery cell stack and to which a module connector is connected; and
a first end plate and a second end plate that are coupled to the module frame, and cover the first busbar frame and the second busbar frame, respectively.

4. The battery module of claim 3, wherein:
in the at least one venting part, the at least one edge connected to the upper part of the module frame is located adjacent to the first end plate.

5. The battery module of claim 3, wherein:
in the at least one venting part, the at least one edge connected to the upper part of the module frame extends along a along the width direction of the module frame.

6. The battery module of claim 3, wherein:
the at least one venting part is configured to be lifted so that any high-temperature heat, gas, and flames are vented in a direction in which the second end plate is disposed.

7. The battery module of claim 3,
wherein the at least one venting part comprises at least two venting parts, and
wherein the at least two venting parts are spaced apart from each other-along a along the longitudinal direction of the module frame.

8. The battery module of claim 7, wherein:
the at least two venting parts are disposed in a same direction as each other.

9. The battery module of claim 3, wherein:
the terminal busbar is connected to an external busbar that allows connection with other battery modules adjacent to the battery module including the terminal busbar.

10. A battery pack comprising the battery module of claim 1.

11. The battery module of claim 1, wherein the width edge is perpendicular to the pair of length edges.

* * * * *